Sept. 22, 1925.                        F. E. LOUDY                        1,554,221
                              RETRACTABLE LANDING GEAR
                                  Filed April 8, 1924
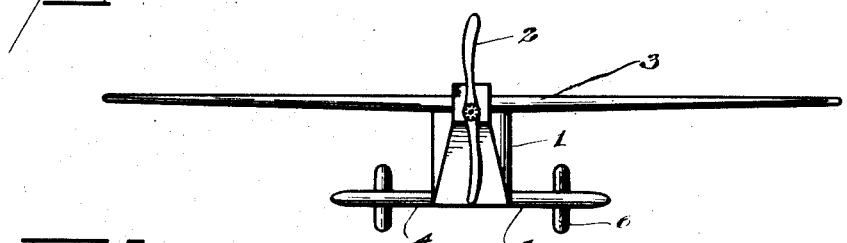
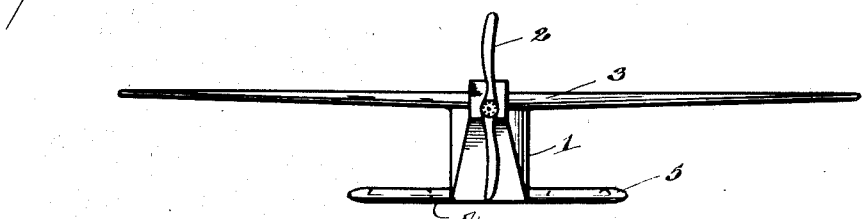
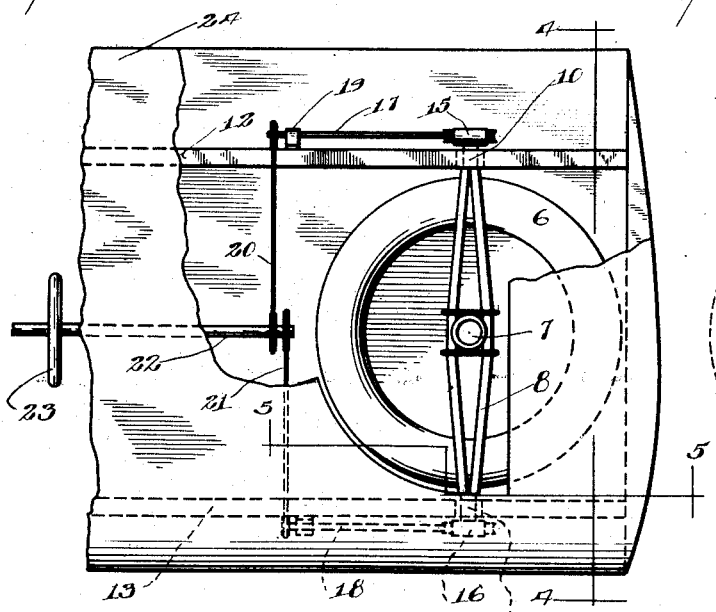
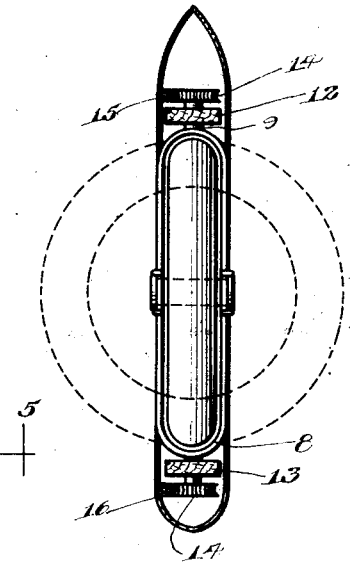
INVENTOR
Flavius E. Loudy
BY
Robert H. Young, ATTORNEY Patented Sept. 22, 1925.

1,554,221

UNITED STATES PATENT OFFICE.

FLAVIUS E. LOUDY, OF AKRON, OHIO.

RETRACTABLE LANDING GEAR.

Application filed April 8, 1924. Serial No. 705,005.

*To all whom it may concern:*

Be it known that I, FLAVIUS E. LOUDY, a citizen of the United States, residing at Akron, in the county of Summit and State of Ohio, have invented certain new and useful Improvements in Retractable Landing Gears, of which the following is a specification.

This invention relates to a retractable landing gear for aircraft, and is especially adaptable to airplanes having a small stub wing extending from the lower part of the fuselage.

The primary object of the invention is the provision of a mounting for an airplane wheel so that the wheel may be retracted by rotation about an axis which coincides with the diameter of the wheel so that the wheel may be housed when in its retracted position within a stub wing of the fuselage. Further objects will be more fully set forth in the attached specification, in the claims, and in the drawings, in which:

Fig. 1 is a front elevational view of an airplane showing the wheels in their landing positions.

Fig. 2 is a front elevation of the same showing the wheels in their retracted housed position.

Fig. 3 is a plan view of a stub wing equipped with one of the retractable landing wheels.

Fig. 4 is a section on line 4—4 of Fig. 3.

Fig. 5 is a section on the line 5—5 of Fig. 3.

Referring to the drawings more particularly by reference numerals, an airplane is shown with a fuselage 1, a propeller 2, and the usual steering and control surfaces (not shown). A main supporting surface is shown in the form of an upper wing 3 of the monoplane type and the lower stub wings 4 and 5 extending laterally from the lower part of the fuselage. Each stub wing supports a landing wheel 6.

The landing wheel is mounted upon an axle 7 and is preferably provided with the usual shock absorbing cords or a shock absorbing wheel may be used which is provided with a resilient shock absorbing connection between the axle and a hub of the wheel. The axle 7 is mounted at each end in a frame or yoke 8 which extends along both sides of the wheel and which is shaped at end thereof so as to provide a shaft 9 which is supported in longitudinally spaced bearings 10 and 11 formed in the rear and front wing beams 12 and 13, respectively, which are suitably mounted upon the fuselage. Each of the shafts 9 extend slightly beyond the wing beams and are provided at their ends with worm gears 14 rigidly connected thereto. The worm gears are driven by means of worms 15 and 16 mounted on shafts 17 and 18 respectively. Bearings 19 are provided on the wing beams in order to support the shafts 17 and 18. The inner ends of these shafts which extend parallel to the wing beams are provided with sprocket gears which are interconnected by means of sprocket chains 20 and 21 to a central operating shaft 22 extending transversely into the fuselage where it is provided with an operating device such as a hand wheel 23 so that it may be operated by the pilot of the aircraft. The shaft 22 extends transversely through the fuselage so that the retracting gear of both wheels are simultaneously operated.

The stub wings are provided with an external covering of fabric or veneer designated 24 which is interrupted at a point above the inside half of the wheel and below the outside half of the wheel so that the wheel may be freely moved to a vertical position when the main supporting yoke is rotated by the pilot about a longitudinal axis which extends through the center of the bearings 10 and 11, this axis coinciding with the central diametrical axis of the wheel itself at right angles to the wheel axle 7.

It will be observed that when the wheels are in their retracted position housed within the wing, the upper and lower surfaces of the wing covering are flush with the sides of the wheel and the external resistance of the wheel will be eliminated so that maximum speeds may be obtained in flight. When it is desired to land, the pilot merely operates the hand wheel 23 so that the yoke is rotated and the landing wheels caused to assume a vertical position as shown in Fig. 1.

I am aware that my invention is susceptible of various modifications. For instance, the stub wing may be dispensed with and the wheel mounted directly on the lower corner of the fuselage so as to be housed therein. I do not desire to be limited to the exact construction which is shown for purposes of illustration, but intend that my invention may be defined as set forth in the following claims.

I claim:—

1. In an aircraft landing gear, an aerofoil, a wheel attached thereto, an axle for said wheel housed within said airfoil, and means supporting said wheel so as said wheel may be rotated about an axis perpendicular to the said axle into said aerofoil.

2. In an aircraft, a fuselage, braces extending therefrom, a landing gear axle and means supporting said axle on said braces so that the wheel may be rotated to a substantially horizontal position about an axis extending through said axle.

3. In an aircraft, a fuselage, braces extending therefrom, a landing gear axle, means supporting said axle on said braces so that the wheel may be rotated to a substantially horizontal position about an axis extending through said axle, and an aerofoil surface supported by said spars.

4. In an aircraft landing gear, a horizontal aerofoil, longitudinally spaced trunnions supported thereby, a wheel supporting frame rotatably mounted in said trunnions, means for rotating said frame in said trunnions, and a wheel axle supported by said frame between said trunnions.

5. In an aircraft, a fuselage, a stub wing extending laterally from the lower part thereof, a landing wheel housed within said wing while in flight, a yoke for supporting said wheel, and means for supporting said yoke revolubly in said stub wing so that the wheel may be rotated about its own diametrical axis to a vertical position.

6. In an aircraft landing gear, a laterally extending aerofoil, a landing wheel rotatable about a horizontal axle, means mounting said wheel in operative position with its axle located substantially within said aerofoil, and means for revolving said wheel and axle to an inoperative horizontal position within said aerofoil.

7. In an aircraft landing gear, a laterally extending aerofoil, a plurality of longitudinally spaced trunnions supported thereby, a landing wheel, an axle therefor, a yoke rotatably mounted in said trunnions and supporting said axle in an operative horizontal position within the aerofoil.

8. In an airplane, an airplane part having a surface exposed to the air rush, a landing wheel, an axle therefor, a plurality of trunnions supported from said airplane part, a yoke mounted on said trunnions and supporting said axle between said trunnion in a normally horizontal transverse position, and manual means for rotating said yoke so that said wheel assumes a horizontal position with a side of the wheel flush with the surface of said airplane part.

9. In an airplane, a fuselage, a stub wing, a front and a rear wing beam therefor, bearings in each of said beams, a landing wheel, an axle therefor, a frame on each side of said wheel supporting said axle at the ends thereof, said frame being pivoted in said bearings so that the wheel axle is normally in an operative horizontal position within said stub wing, a hand operated member, and gearing interconnecting said hand operated member and said frame so as to rotate the frame and wheel to an inoperative horizontal position with a surface of the stub wing flush with a side of the wheel.

In testimony whereof I affix my signature.

FLAVIUS E. LOUDY.